United States Patent
Kunc et al.

(10) Patent No.: US 10,296,822 B2
(45) Date of Patent: *May 21, 2019

(54) RFID TRANSPONDER DEVICE AND METHOD FOR PRODUCTION OF AN RFID TRANSPONDER DEVICE

(71) Applicant: STMicroelectronics International N.V., Schiphol (NL)

(72) Inventors: Vinko Kunc, Ljubljana (SI); Anton Stern, Preddvor (SI); Kosta Kovacic, Orehovas vas (SI); Albin Pevec, Ljubljana (SI); Maksimiljan Stiglic, Maribor (SI)

(73) Assignee: STMicroelectronics International N.V., Schiphol (NL)

( * ) Notice: Subject to any disclaimer, the term of this patent is extended or adjusted under 35 U.S.C. 154(b) by 0 days.

This patent is subject to a terminal disclaimer.

(21) Appl. No.: 15/894,440

(22) Filed: Feb. 12, 2018

(65) Prior Publication Data

US 2018/0165569 A1 Jun. 14, 2018

Related U.S. Application Data

(63) Continuation of application No. 15/397,559, filed on Jan. 3, 2017, now Pat. No. 9,928,458, which is a (Continued)

(30) Foreign Application Priority Data

Jul. 8, 2013 (EP) ..................... 13175568

(51) Int. Cl.
*G06K 19/07* (2006.01)
*G06K 19/077* (2006.01)

(52) U.S. Cl.
CPC .... *G06K 19/07773* (2013.01); *G06K 19/0715* (2013.01); *G06K 19/0775* (2013.01); *G06K 19/07749* (2013.01)

(58) Field of Classification Search
CPC ......... G06K 19/0715; G06K 19/07749; G06K 19/0775; G06K 19/07773
See application file for complete search history.

(56) References Cited

U.S. PATENT DOCUMENTS 5,594,448 A 1/1997 d'Hont
9,203,453 B2 12/2015 Farrell et al.
(Continued)

FOREIGN PATENT DOCUMENTS

WO 2012038664 A2 3/2012
WO 2013002736 A1 1/2013

*Primary Examiner* — Seung H Lee
(74) *Attorney, Agent, or Firm* — Slater Matsil, LLP

(57) ABSTRACT

An RFID transponder device has antenna terminals for coupling an antenna system to the device. A transmitter and a receiver are coupled to the antenna terminals. The device has at least one damping resistance connected to at least one of the antenna terminals. The at least one damping resistance is connected, depending on a voltage swing at the antenna terminals during a transmission burst period, either together with a serially connected switch in parallel to the antenna terminals that are coupled to the receiver, or together with a parallel connected switch between one of the antenna terminals and a terminal of the transmitter. A damping control is configured to activate the at least one damping resistance during a damping period after the transmission burst period by controlling the respective switch.

20 Claims, 10 Drawing Sheets

Related U.S. Application Data continuation of application No. 14/903,584, filed as application No. PCT/EP2014/062272 on Jun. 12, 2014, now Pat. No. 9,576,237.

(56) References Cited

U.S. PATENT DOCUMENTS

| | | |
|---|---|---|
| 9,576,237 B2 | 2/2017 | Kunc et al. |
| 9,928,458 B2 * | 3/2018 | Kunc ................ G06K 19/0715 |
| 2010/0245039 A1 | 9/2010 | Tokunaga |
| 2012/0071089 A1 | 3/2012 | Charrat et al. |
| 2013/0003712 A1 | 1/2013 | Kunc et al. |
| 2016/0371580 A1 | 12/2016 | Kunc |

* cited by examiner

RFID TRANSPONDER DEVICE AND METHOD FOR PRODUCTION OF AN RFID TRANSPONDER DEVICE

CROSS-REFERENCE TO RELATED APPLICATIONS

This application is a continuation of U.S. patent application Ser. No. 15/397,559, filed on Jan. 3, 2017, which is a continuation of U.S. patent application Ser. No. 14/903,584, filed on Jan. 7, 2016, now U.S. Pat. No. 9,576,237, which is a national phase filing under section 371 of International Patent Application No. PCT/EP2o14/062272, filed on Jun. 12, 2014, which claims the priority of European Patent Application No. 13175568.8, filed on Jul. 8, 2013, each of which applications are hereby incorporated herein by reference in its entirety.

TECHNICAL FIELD

The disclosure relates to an RFID transponder device and to a method for production of such a device.

BACKGROUND

In various applications of inductive coupling communication, RFID systems are used which, for example, are operated at 13.56 MHz. Communication in these systems is done by magnetic coupling between an RFID reader coil and an RFID tag coil. RFID tags are passive devices, which for example are composed of an integrated circuit and some kind of antenna that is attached to terminals of the integrated circuit. For example, data are transmitted from the tag to the reader using a load modulation. In other implementations, active transmission is used for transmitting data. Examples for systems with active transmission can be found in WO 2013/002736 A1.

U.S. Patent Appl. Pub. No. 2010/0245039 A1 shows a low frequency wake-up device with three receiver antennas, whose Q-factor can be adjusted, and with a separate transmitter antenna. In contrast to RFID systems, different antennas and frequencies are used for transmitting and receiving signals.

Active transmit systems need to synchronize their internal frequency source to the frequency and phase of a carrier signal emitted by the reader. This is usually done using a phase-locked loop, PLL, system which locks to the receive signal of the tag, in particular the induced signal resulting from the magnetic field of the reader. Accordingly, in conventional applications such a PLL is in a locked mode during a receive phase when the tag is not transmitting. When an active transmission of the tag starts, the amplitude of the transmit signal, in particular at the antenna of the tag, may be two orders of magnitude higher than the amplitude of the receive signal. This can effect that the receive signal may be completely obscured by the transmission signal.

Accordingly, the PLL preferably is operated in an unlocked state or free run state during this time. As it cannot be easily achieved that a free running PLL keeps its phase relation to a reader's carrier signal for a longer period of time, usually a resynchronization is performed in appropriate intervals. For example, the resynchronization is preferably performed in short time slots during a transmission of a data frame, when there is a pause in a transmit burst. However, due to the different oscillation amplitudes between transmission and reception of signals, and in particular the need for lower oscillation amplitudes, it is desirable to change the oscillation amplitude for resynchronization.

SUMMARY

The present disclosure provides an improved concept for RFID transponder systems allowing a more accurate frequency resynchronization.

Various embodiments of an RFID transponder device for example comprise antenna terminals for coupling an antenna system to the device. Furthermore, such a device includes a transmitter coupled to the antenna terminals and configured to provide an oscillating signal to the antenna terminals, and a receiver coupled to the antenna terminals and configured to receive an oscillating signal at the antenna terminals. Such a device is particularly configured to transmit data by means of the transmitter in transmission burst periods. For example, such a transponder device is used in RFID tags using active transmission.

The improved concept is based on the idea that a voltage swing at the antenna terminals during a transmission burst period is too high for detecting a carrier frequency signal, which can be used as a reference signal for generating an internal clock signal. To this end, damping is performed during a damping period after the transmission burst period. However, the kind of damping depends on an absolute value of the voltage swing during the transmission burst period. Hence, depending on the voltage swing at the antenna terminals during the transmission burst periods a damping resistance is connected either together with a serially connected switch in parallel to the antenna terminals that are coupled to the receiver, or together with a parallel connected switch between one of the antenna terminals and a terminal of the transmitter.

A respective RFID transponder device therefore further comprises a damping control being configured to activate the at least one damping resistance during the damping period by controlling the respective switch. In particular, for the resistance with the serially connected switch, the switch is closed during a damping period, and for the damping resistance with the parallel connected switch, the switch is opened during the damping period.

For example, for lower voltage swings during the transmission burst period the damping resistance in parallel to the antenna terminals can be used. Preferably, a resistance value of the damping resistance is adapted to the antenna system coupled to the device, respectively the antenna terminals. In particular, the damping resistance value is in the order of about 10 Ω to 100 Ω and is particularly higher than the resistance value of a closed switch taken alone.

For higher voltage swings at the antenna terminals, the damping resistance connected serially between one of the antenna terminals and a terminal of the transmitter or the receiver can be used. Such an application is particularly useful if respective voltages are too high for operating the integrated circuit respectively the device without the risk of damage or destruction of the device due to technology specifications.

In any case, the damping can be performed with a transponder device according to the improved concept such that resynchronization is possible with an improved accuracy and within reasonably short time.

A transponder device according to the improved concept may comprise both the serially connected damping resistance and the parallel connected damping resistance or just one of the respective damping resistances, if the voltage range of the voltage swing is known in advance. If both kinds of structures are provided during production of such a transponder device, the non-used damping structure could be deactivated on a temporary basis or permanently. Accordingly, a transponder device according to the improved concept can be produced efficiently.

For example, an embodiment of an RFID transponder device according to the improved concept further to the transmitter and the receiver comprises at least one damping resistance connected to at least one of the antenna terminals. The at least one damping resistance is connected, depending on a voltage swing at the antenna terminals during a transmission burst period, either together with a serially connected switch in parallel to the antenna terminals, or together with a parallel connected between one of the antenna terminals and a terminal of the transmitter or the receiver. The device further comprises a damping control being configured to activate the at least one damping resistance during a damping period after the transmission burst period by controlling the respective switch.

Preferably, the damping period consists of one to four carrier periods of a carrier signal received from an RFID reader. For example, a time period between two transmission burst periods consists of eight such carrier periods, as for instance defined in well known standards ISO/IEC 14443 Type A or B.

A transponder device according to the improved concept may be configured to synchronize to a carrier signal received at the antenna terminals during a synchronization period between the damping period and a following transmission burst period of the device during operation. For example, the synchronization period may consist of all or a part of the remaining carrier periods between the damping period and the following transmission burst period.

It should be noted that for various embodiments of the transponder device according to the improved concept, it can be implemented both as a single-ended and as a differential system. Both types of system, without damping, are well-known in the art. For example the transponder device may include a PLL circuit for generating an internal clock frequency based on a signal at the antenna terminals after the damping period, in particular between the damping period and the following transmission burst period. Such a PLL circuit may be located within the receiver, the transmitter or may be combined with the receiver and the transmitter on a common integrated circuit.

According to some embodiments, a first transmitter output terminal of the transmitter is connected to one of the antenna terminals by a parallel connection of a first damping resistance and a first switch. In particular, the first damping resistance is the at least one damping resistance mentioned before. For example, such a configuration can be used with an antenna system that is connected by a single-ended connection. This may also be combined with the application of an EMC filter comprised by the antenna system. For example, the device may comprise one or two additional terminals for connecting filter capacitances of the antenna system. This additional terminal or these additional terminals may be coupled to a reference potential terminal by further damping resistances having a switch connected in parallel.

In particular for differential connections of the antenna system, a second transmitter output terminal of the transmitter may be connected to a further one of the antenna terminals by a parallel connection of a second damping resistance and a second switch. Preferably, the first and the second switch may be controlled concurrently by the damping control, i.e. with the same switching control signal.

In various embodiments of the transponder device, in addition or as an alternative to the serially connected damping resistance, a series connection of a fourth damping resistance and a fourth switch may be connected between a first and a second receiver input terminal of the receiver.

For example, if the transmitter antenna terminals are connected by the first and the second damping resistance with respective parallel connected switches, and the antenna system comprises a balun, the fourth damping resistance may be provided additionally.

In further embodiments the transponder device may contain a series connection of the fourth damping resistance and the fourth switch and further comprises a bias circuit that is connected to the first and the second receiver input terminal of the receiver. The bias circuit is configured to provide a DC bias voltage to the antenna terminals. Hence, an oscillating signal at the antenna terminals, respectively the receiver input terminals, oscillates around the bias voltage provided by the bias circuit. This may have the effect that, depending on the voltage swing and the bias voltage, the resulting voltage values become positive during a full oscillation, or in other words, no negative voltages occur at the receiver input terminals.

For example, the bias circuit comprises a voltage source that is connected to both the first and the second receiver input terminal by a respective resistive element.

The above example refers to a double-ended implementation with a parallel damping structure including the bias circuit and the series connection of the fourth damping resistance and the fourth switch. A similar implementation can be made for a single-ended antenna configuration.

Accordingly, in some embodiments the transponder device may contain a series connection of the fourth damping resistance and the fourth switch and further comprises a bias circuit. The bias circuit comprises a voltage source that is connected to a first receiver input terminal of the receiver by a resistive element and is configured to provide a DC bias voltage to the first receiver input terminal. In this configuration, the first receiver input terminal is coupled to one of the antenna terminals, while a connection point of the voltage source with the resistive element is coupled to a further one of the antenna terminals. The series connection of the fourth damping resistance and the fourth switch is connected between the one and the further one of the antenna terminals described above.

For example, an antenna coil may be connected with one end to the first receiver input terminal, while the second end of the antenna coil is connected to the connection point of the voltage source with the resistive element, respectively the further one of the antenna terminals. Also in this configuration an oscillating signal at the single receiver input terminal oscillates around the bias voltage provided by the bias circuit. As described above, this may have the effect that, depending on the voltage swing and the bias voltage, the resulting voltage values become positive during a full oscillation, such that no negative voltages occur at the receiver input terminal.

For example, the bias voltage in the embodiments above is selected on the basis of the voltage swing, in particular to be at least as high as an amplitude of the voltage swing, or expressed differently, being about half a peak-to-peak value of the voltage swing.

The decision whether to choose a parallel connected damping resistance or a serially connected damping resistance between the antenna terminals and the receiver or transmitter terminals is, for example, based on a voltage that the respective circuits of the transponder can handle. In particular, there usually are technology-dependent limitations that assure that the circuits are not damaged or destroyed by too high voltages. Hence, if an expected voltage swing at the antenna terminals during a transmission burst period is in an applicable range, the approach with the fourth damping resistance connected between the first and the second receiver input terminal in combination with the bias circuit may be used. In such applications the bias voltage for example is selected to be in the range of 40% to 60%, in particular 45% to 55% of a technology-dependent maximum voltage of the transponder device. In other words, the bias voltage is around half the maximum voltage of the device. As a consequence, a voltage swing with an amplitude being safely less than half that maximum voltage oscillates between a minimum voltage that is still positive and a maximum voltage that is below the technology-dependent maximum voltage of the device.

In such and other embodiments, the transponder device, in particular the receiver, may be free from an over-voltage protection with respect to a positive supply voltage. Accordingly, the respective device can be built with less effort.

In the various embodiments described above a resistance value of the fourth damping resistance may be selectable depending on characteristics of the antenna system to be connected. In particular, an optimum resistance value can be determined with respect to capacitances and inductances of the antenna system. For example, higher resistances may provide a better damping for inductances, while lower resistance value may be more suitable for damping of oscillation with respect to capacitances. An optimum value for the damping resistance may be determined by measurements or simulations in advance of finalizing the transponder device. As mentioned before, such resistance value may be in the range of 10 Ω to 100 Ω.

In various embodiments the transponder device comprises the fourth damping resistance and the fourth switch as described before and furthermore the bias circuit. The device additionally comprises the parallel connection of the first damping resistance and the first switch, the parallel connection being connected between one of the antenna terminals and the first transmitter output terminal of the transmitter. This parallel connection forms a first damping structure, whereas the bias circuit and the series connection of the fourth damping resistance and the fourth switch form a second damping structure. In such a configuration, the transponder device further comprises a selection unit configured to select one of the first and the second damping structure as being enabled and the other one of the first and the second damping structure as being disabled. Preferably, that selection is made on the basis of the voltage swing during the transmission burst period, as described before.

In some embodiments, the selection may be made during operation of the transponder device, for example depending on different operating states. In other embodiments, the selection unit is configured to perform the selection of the enabled damping structure once only.

For example, the transponder device generally is produced with both variants of the damping resistances. When the final application and the respective specifications for the transponder device are defined, the damping structure, which is not needed according to the specifications, can be deactivated in a final production step. For example, the selection unit comprises one or more fuses that for instance bridge the respective damping resistances. Such fuses may be blown to activate or deactivate, respectively, the damping resistances as needed.

As an alternative, the desired configuration may be stored in a non-volatile memory like an EEPROM. It is also possible to perform the configuration by programming through a host interface, if present.

Accordingly, in each case a single design for the transponder device can be used that allows application for different system requirements.

For example, an embodiment of a method for production of an RFID transponder device according to the improved concept comprises provision of antenna terminals for coupling an antenna system to the device. A transmitter is provided that is coupled to the antenna terminals and configured to provide an oscillating signal to the antenna terminals. A receiver is provided coupled to the antenna terminals and configured to receive an oscillating signal at the antenna terminals. A first damping structure is provided that comprises a parallel connection of a first damping resistance and a first switch, the parallel connection being connected between one of the antenna terminals and a first transmitter output terminal of the transmitter. A second damping structure is provided comprising a series connection of a further damping resistance and a further switch being connected between a first and a second receiver input terminal. According to the improved concept, the method comprises selecting, in particular selecting once only, one of the first and the second damping structure as being enabled and the other one of the first and the second damping structure as being disabled. The selection depends on a voltage swing at the antenna terminals during a transmission burst period of the device during operation.

Further embodiments of the above-described method, in particular with respect to further damping resistances, and, for instance, the bias circuit become apparent from the various embodiments of the RFID transponder device described above. For example, the first damping structure may be provided with a further parallel connection of a second damping resistance and a second switch, the further parallel connection being connected between a second one of the antenna terminals and a second transmitter output terminal of the transmitter.

Various implementations of the transponder device may be used, particularly in an RFID tag that preferably uses active transmission for transmitting data from the RFID tag to an RFID reader.

BRIEF DESCRIPTION OF THE DRAWINGS

The text below explains the invention in detail using exemplary embodiments with reference to the drawings. Components and circuit elements that are functionally identical or have the identical effect bear identical reference numbers. In so far as circuit parts or components correspond to one another function, description of them will not be repeated in each of the following figures.

In the drawings.

DETAILED DESCRIPTION OF ILLUSTRATIVE EMBODIMENTS

Figure 1:
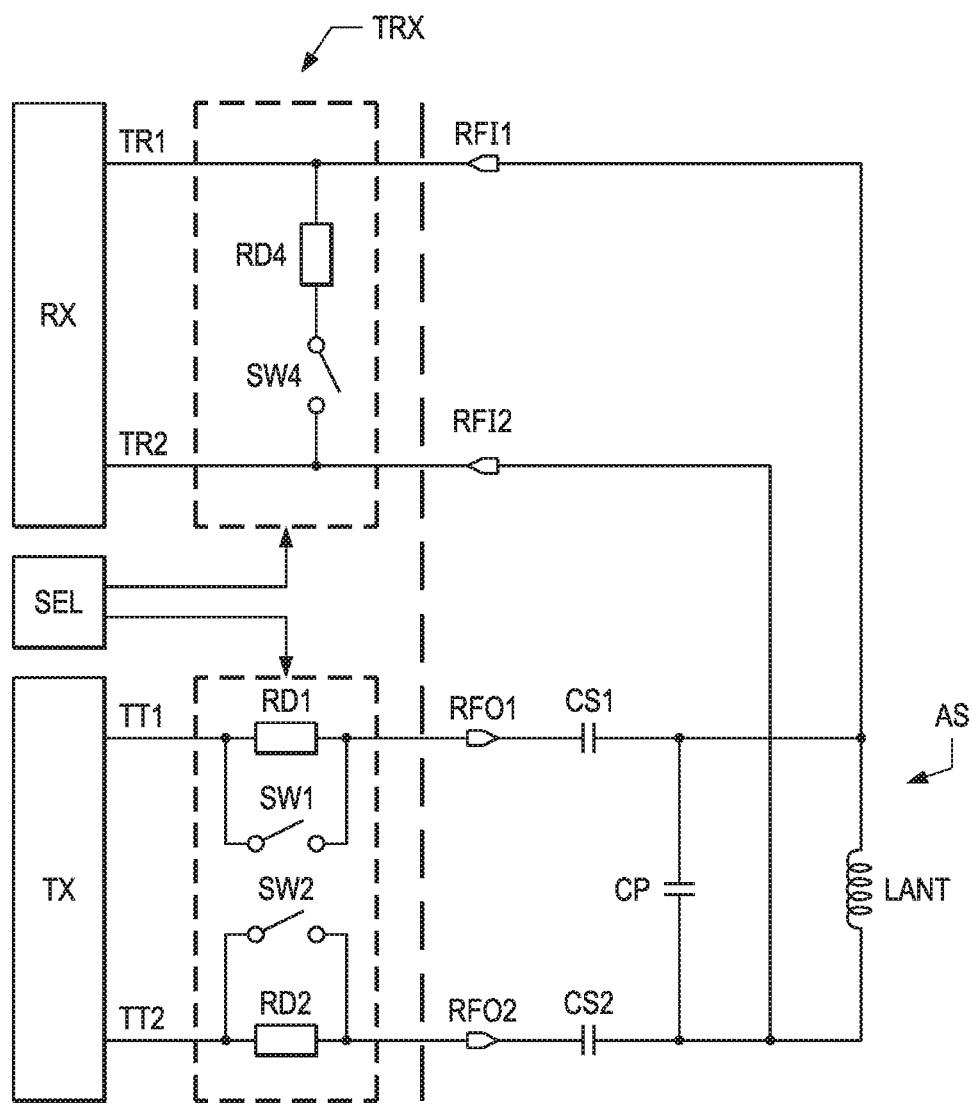
FIG. 1 shows an exemplary embodiment of an RFID transponder device.

FIG. 1 shows an exemplary embodiment of an RFID transponder device TRX that is coupled to an antenna system AS. This and following embodiments of a RFID transponder device, for example, are used in RFID tags or RFID systems for example operating at 13.56 MHz, which is also referred to as high frequency RFID. Communication in these systems is done by magnetic coupling between an RFID reader coil (not shown here) and an RFID tag coil. RFID tags may be integrated in storage cards like micro SD cards or SIM cards. For example, such RFID tags are operated with a power supply provided and use active transmission instead of a load modulation used by passive RFID tags.

In the embodiment of FIG. 1, the RFID transponder device TRX comprises a receiver RX having receiver input terminals TR1, TR2, and a transmitter TX with transmitter output terminals TT1, 172. A first receiver input terminal TR1 is coupled to a first input antenna terminal RFI1, whereas the second receiver input terminal TR2 is coupled to a second input antenna terminal RFI2. The coupling between the receiver input terminals TR1, TR2 and the antenna input terminals RFI1, RFI2 may be a direct connection.

Similarly, a first transmitter output terminal TT1 is coupled to a first antenna output terminal RFO1, whereas a second transmitter output terminal TT2 is coupled to a second antenna output terminal RFO2. In particular, the first transmitter output terminal TT1 is coupled to the first antenna output terminal RFO1 by a first damping resistance RD1, to which a first switch SW1 is connected in parallel. In a similar fashion, a second damping resistance RD2, to which a second switch SW2 is connected in parallel, is connected between the second transmitter output terminal TT2 and the second antenna output terminal RFO2.

On the receiver side, a series connection of a further damping resistance RD4 and a further switch SW4 is connected between the first and the second antenna input terminal RFI1, RFI2. In other words, the damping resistance RD4 with the serially connected switch SW4 form a parallel damping structure, whereas the serially connected resistances RD1, RD2 with their respective switches SW1, SW2 form a serial damping structure.

The transponder device TRX comprises a selection unit SEL that is configured to control an operation or activation of the serial damping structure and/or the parallel damping structure.

The antenna system AS comprises an antenna coil LANT connected between the antenna input terminals RFI1, RFI2 with a parallel connected capacitance CP. Furthermore, the parallel connection of the antenna coil LANT and the capacitance CP is connected to the antenna output terminals RFO1, RFO2 by a respective capacitance CS1, CS2.

For example, the transponder device TRX is part of an active transmit tag system, which needs to synchronize an internal frequency source to a frequency in phase of a carrier signal emitted by a corresponding reader system. This may be done using a phase locked loop, PLL, system (not shown here), which may be a further part of the transponder device TRX. Such a PLL system may lock to the receiver signal of the tag that corresponds to a signal induced by the reader's system magnetic field.

During a transmission burst period an amplitude of a transmit signal on the antenna system AS may be much higher than an amplitude of the receive signal, to which the PLL tries to synchronize. For example, the transmit signal is about two orders of magnitude higher than the amplitude of the receive signal. Accordingly, during the transmission burst period, useful operation of the PLL may not be possible such that the PLL system stops synchronizing on the receive signal. However, as usually PLLs are not able to keep their phase relation for a longer period of time, a resynchronization is to be performed at short enough intervals to keep a phase relation between the internal frequency source and the receive signal within desired boundaries. However, such synchronization can only be performed in the period between two transmission burst periods. Furthermore, due to the higher amplitude during the transmission burst period and the oscillation properties of the antenna system, the amplitude on the antenna terminals decays slowly without application of specific measures. In particular, the transponder device TRX shown in FIG. 1 is able to perform a damping during a damping period after the transmission burst period, such that synchronization is possible.

Basically, the damping can be performed in two different ways. The first kind of damping is performed by the parallel damping structure RD4, SW4 with a closed switch SW4 during the damping period. Accordingly, energy stored in the antenna system AS is reduced by the damping resistance, thus eliminating the high oscillation amplitude of the transmit signal such that the carrier signal can be received by the transponder device TRX, respectively the receiver RX and forwarded to the PLL system in a synchronization period following the damping period. For example, the damping is controlled by the damping control, which may be part of an integrated circuit comprising the transponder device TRX and which is not shown here for reasons of a better overview only.

The second damping approach is performed with the serial damping structure with damping resistances RD1, RD2. Accordingly, during the damping period the switches SW1, SW2 are open, whereas these switches are in a closed state otherwise, bridging the damping resistances RD1, RD2. Also these damping resistances RD1, RD2 allow a reduction of the oscillation amplitude after the transmission burst period.

The selection unit SEL may activate one of the damping structures while deactivating the other damping structure, depending on a voltage swing expected or measured during the transmission burst period. Hence, the RFID transponder device TRX can be adapted easily to various applications with higher or lower voltage swings during the transmission burst periods. Such a selection may be performed reversibly during operation or before operation of the transponder device TRX, particular if different levels of voltage swings are to be expected. For example, the desired configuration may be stored in a non-volatile memory like an EEPROM. It is also possible to perform the configuration by programming through a host interface, if present.

However, in alternative implementations, the selection may be made once only or irreversibly. Such a selection may be performed by the usage of fuses or the like. The decision which of the damping structures is to be used may be made on the integrated circuit technology used for the transponder device TRX, in particular, based on whether the technology is able to withstand voltages at the antenna terminals without being damaged or destroyed.

Figure 2:
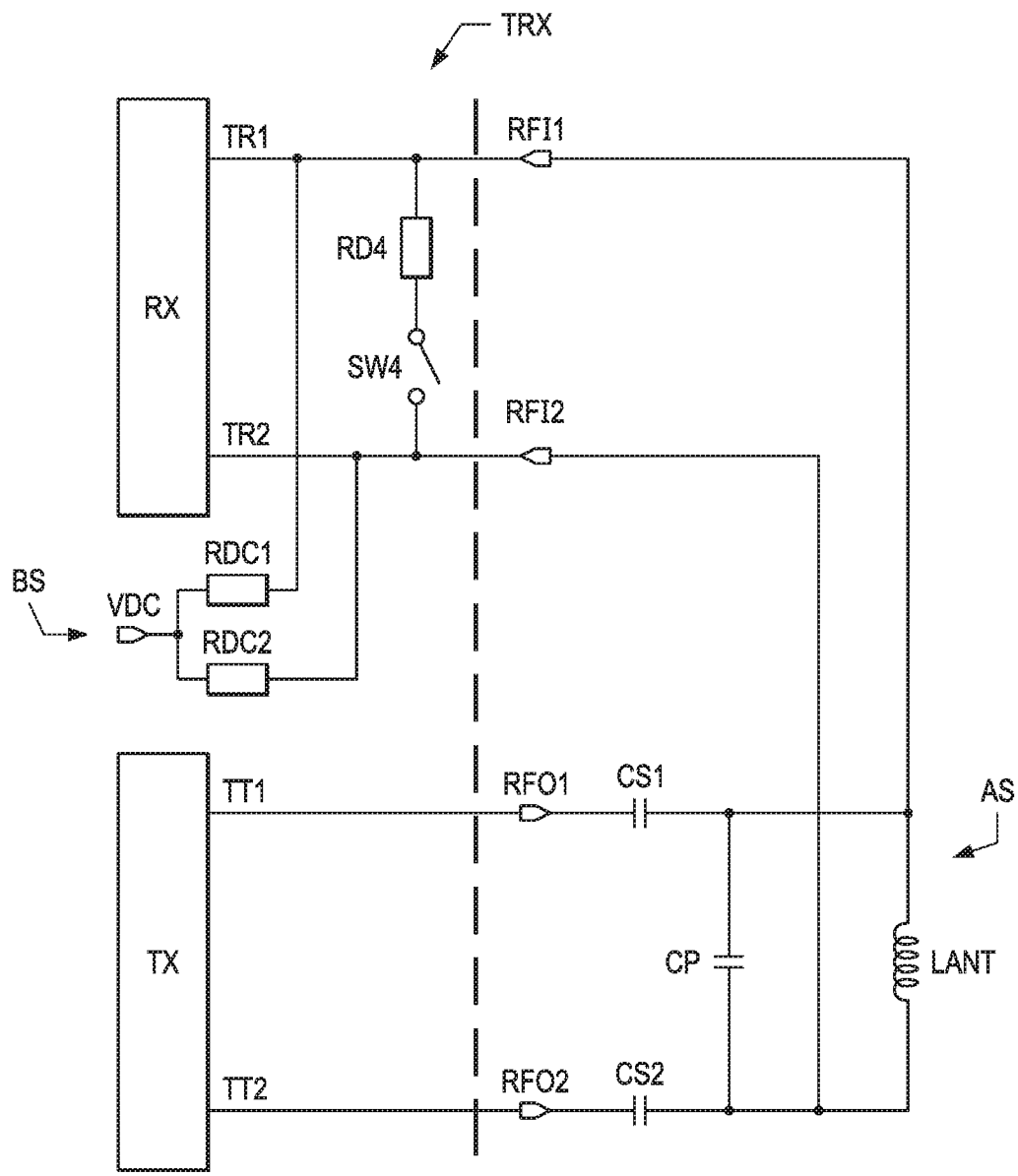
FIG. 2 shows a further exemplary embodiment of an RFID transponder device.

FIG. 2 shows an implementation of the transponder device TRX, which is based on the embodiment of FIG. 1. However, in the embodiment of FIG. 2, only the parallel damping structure is selected, whereas the serial damping structure is omitted or deactivated, respectively. Additionally, a bias circuit BS is provided, which is connected to the receiver input terminals TR1, TR2 and the antenna input terminals RFI1, RFI2, respectively. The bias circuit BS comprises a voltage source VDC, or a respective connection to a voltage source VDC, that is coupled to the terminals TR1, TR2 by respective resistors RDC1, RDC2. During operation of the transponder device TRX, in particular during the damping period, the bias circuit BS provides a bias voltage to the receiver input terminals TR2, TR2, which forms a base level for the oscillating voltage signal of the antenna system.

Preferably, the bias voltage is chosen such that it is at least as high as an amplitude of the voltage swing during the transmission burst period, or expressed differently, being about half a peak-to-peak value of the voltage swing, such that no negative voltages result at the receiver input terminals TR1, TR2. Preferably, both a lowest possible voltage value and a highest possible value at the antenna terminals RFI1, RFI2 are both positive values and smaller than a voltage that can be handled by the integrated circuit technology.

In preferable implementations, the bias voltage at the receiver input terminals TR1, TR2 are set to about half of a technology-dependent maximum voltage of the device. For example, the bias voltage is selected to be in the range of 40% to 60%, in particular 45% to 55% of the maximum voltage. This can ensure that the amplitude does not decrease below a base level of the supply voltage. This also effects that an input node ESD (electrostatic discharge) protection is not triggered on negative amplitude peaks on the antenna. Such ESD clamping diodes may be inherently present between receiver input terminals TR1, TR2 and a ground connection.

If a positive amplitude on the antenna terminals RFI1, RFI2 exceeds a positive supply voltage of the integrated circuit, respectively the transponder device TRX, this can be handled using an input ESD protection of the integrated circuit without clamping diodes to a positive supply terminal. Accordingly, the receiver RX may be free from an overvoltage protection with respect to a positive supply voltage.

In such a configuration, a limit in the positive direction is thus only the maximum voltage allowed by the integrated circuit technology.

Such configuration may ensure that a signal swing on the antenna terminals RFI1, RFI2 is inside predefined limits, which for example are set by a lower supply voltage and a higher supply voltage such that a conventional solid state switch can be employed and integrated into the integrated circuit. Due to the fourth damping resistance RD4, the antenna system is not only short-circuited but results in a current flow through the resistance RD4, which effects energy dissipation of the energy stored in the antenna system AS. In particular, the resistance value of the damping resistance RD4 may be adapted to the specifications of the antenna system AS. Such a resistance value may be in the range of 10 Ω to 100 Ω. Particularly, using the switch SW4 alone without employing any additional resistance and thus only effecting the negligible resistance of the closed switch, may not lead to any energy dissipation depending on the variable switching times of such switch with respect to the unknown carrier signal. For example, if a switch alone is closed at the time when the complete energy is stored in the coil LANT, no energy will be dissipated.

For instance, an optimum resistance value of the fourth damping resistance RD4 may be determined by means of calibration or simulation advance of an actual operation of the transponder device TRX. For example, an optimum value can be found between a higher resistance value being able to dissipate energy from the inductances and a lower resistance for dissipating energy from capacitances.

Figure 3:
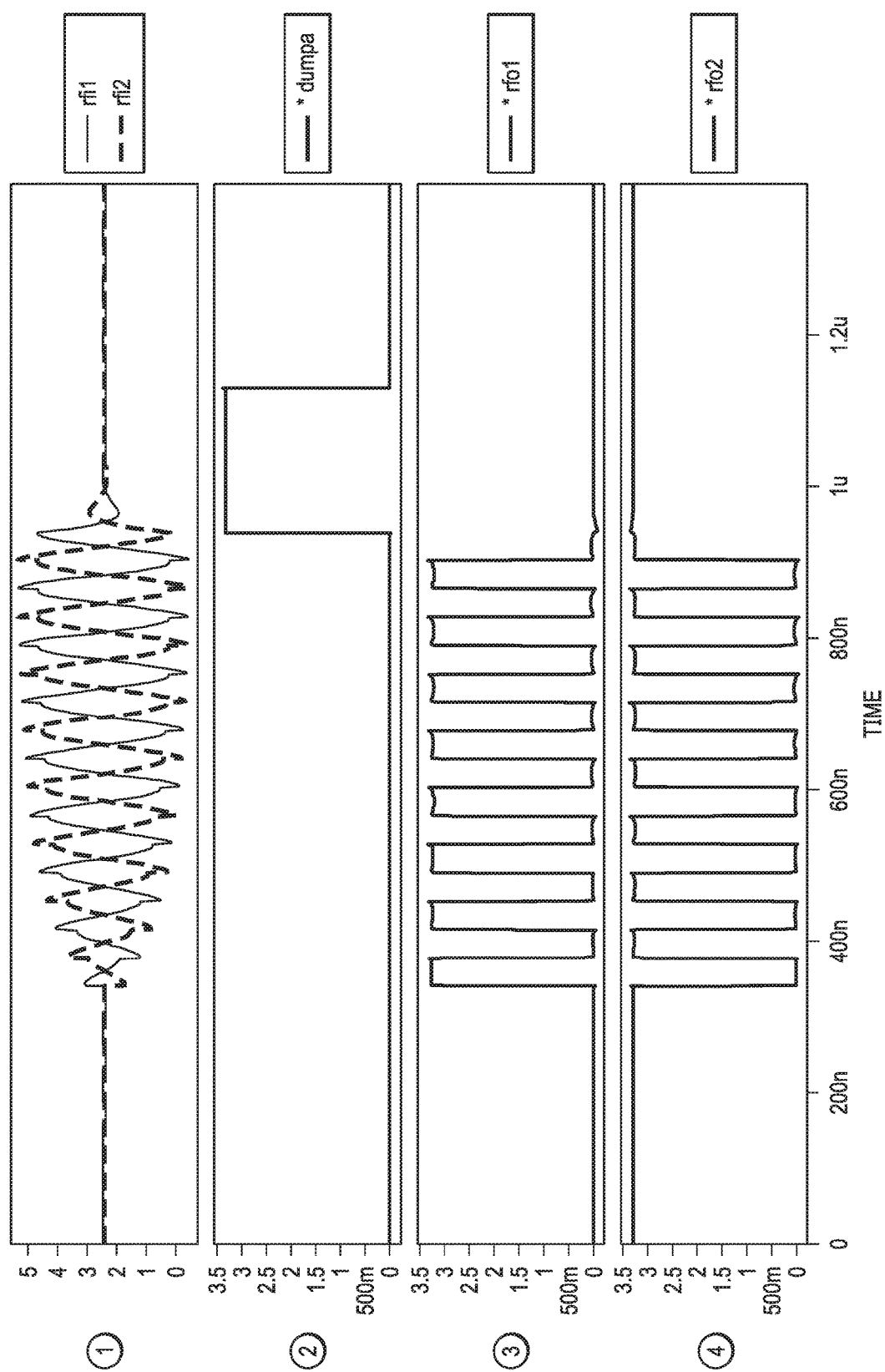
FIG. 3 shows an exemplary signal time diagram of signals within an RFID transponder device.

FIG. 3 shows a signal time diagram of signals which may be present in a system shown in FIG. 2. For example, the upper canvas 1 shows voltage values at both the antenna input terminals RFI1, RFI2. The second canvas 2 shows a control signal which activates the damping structure during its high state. As can be seen from the upper canvas, the signal amplitude of the signals at the input terminals RFI1, RFI2 can be decreased efficiently. The two lower canvases 3, 4 show the respective driving signals at the antenna output terminals RFO1, RFO2. As can be easily seen, the transmission burst period consists of eight consecutive carrier periods of the corresponding reader system, as for instance defined in well known standards ISO/IEC 14443 Type A or B. Accordingly, the damping period lasts about 2 to 3 of such carrier periods. A resynchronization can be performed after the damping period in a synchronization period, which lasts up to the next transmission burst period. For example, an intermediate period between two transmission burst periods lasts for at least eight carrier periods.

Figure 4:
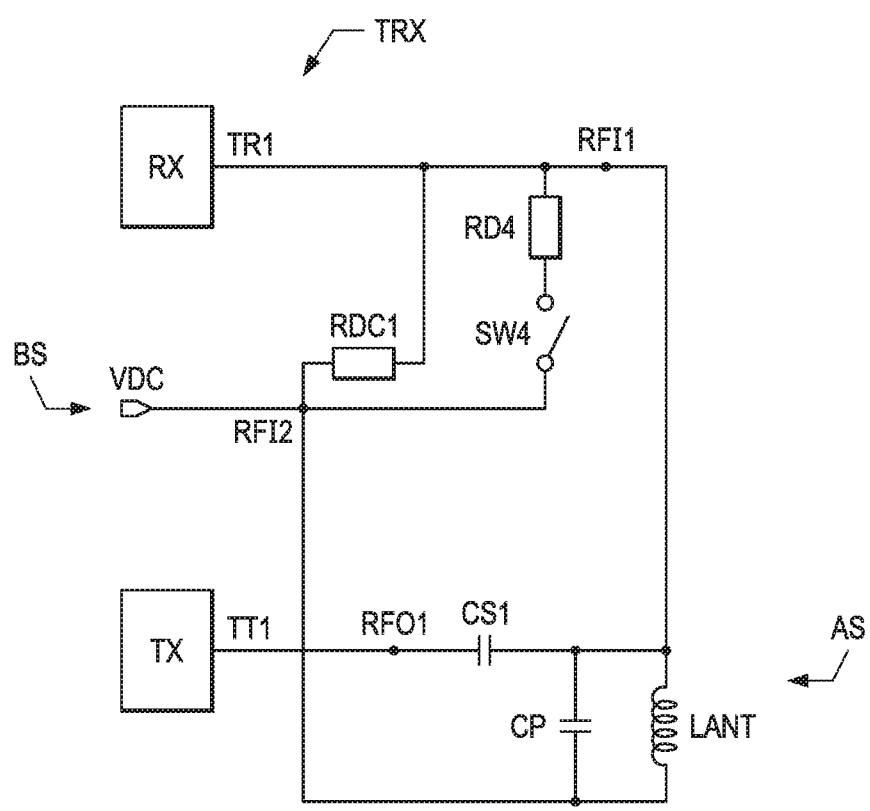
FIG. 4 shows a further exemplary embodiment of an RFID transponder device.

FIG. 4 shows a further implementation of the transponder device TRX which is based on the embodiment of FIG. 1. In particular, the embodiment of FIG. 4 can basically be seen as a single-ended version of the embodiment of FIG. 2. Hence, only the parallel damping structure is selected, whereas the serial damping structure is omitted or deactivated, respectively.

The transponder device TRX of FIG. 4 comprises the receiver RX having a single receiver input terminal TRI1, and the transmitter TX having a single transmitter output terminal TT1. The receiver input terminal TR1 is directly connected to a first antenna input terminal RFI1. A second antenna input terminal RFI2 is connected to a voltage source VDC, which is part of the bias circuit BS. The voltage source VDC is connected to the receiver input terminal TR1, respectively the first antenna input terminal RFI1 by means of a resistive element RDC1. The parallel damping structure RD4, SW4 is connected between the first and the second antenna input terminal RFI1, RFI2. The parallel connection of the antenna coil LANT and the capacitor CP is connected on one side to the first antenna input terminal RFI1 in a direct fashion, and connected to the antenna output terminal RFO1 by means of the capacitor CS1. The other end of the parallel connection of the antenna coil LANT and the capacitor CP is connected to the second antenna input terminal RFI2.

Regarding preferable implementations of the embodiment of FIG. 4, it is referred to the description of FIG. 2, in particular with respect to a selection of the bias voltage and a selection of an optimum resistance value of the fourth damping resistance RD4.

Figure 5:
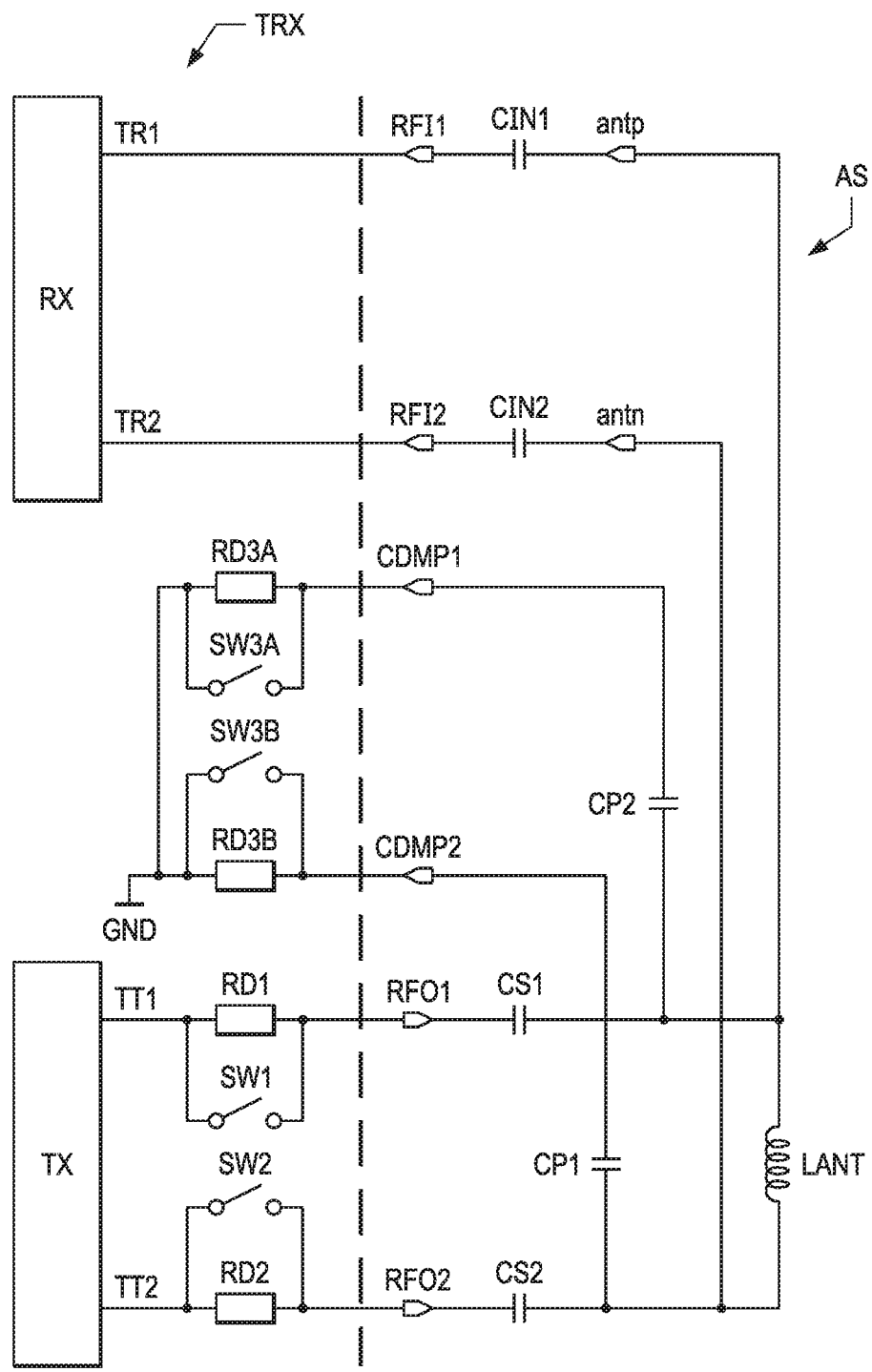
FIG. 5 shows a further exemplary embodiment of an RFID transponder device.

FIG. 5 shows a further embodiment of an RFID transponder device TRX with an antenna system AS coupled thereto. Also this embodiment is based on the embodiment described in conjunction with FIG. 1. However, in the embodiment of FIG. 5 the parallel damping structure RD4, SW4 is omitted. In addition to the configuration of FIG. 1, the system shown in FIG. 5 comprises additional capacitive elements CP1, CP2, which are connected between respective ends antn, antp of the antenna coil LANT and a first and a second auxiliary terminal CDMP1, CDMP2 of the transponder device TRX. These auxiliary terminals CDMP1, CDMP2 are respectively connected to a reference potential terminal GND by means of respective damping structures being implemented as a parallel connection of damping resistances RD3A, RD3B which respective switches SW3A, SW3B. Respective ends antp, antn of the antenna coil LANT are connected to the antenna input terminals RFI1, RFI2 by means of the capacitive elements CIN1, CIN2.

Accordingly, in the embodiment of FIG. 5 a damping of the oscillation amplitude occurring during the transmission burst period is performed by serial damping structures. Such a decision or selection is, for example, made if the voltage swing of the signal on the antenna terminals is too high for the transponder device TRX or the corresponding integrated circuit, respectively, to be directly connected.

Preferably, as shown in FIG. 5, a damping is implemented on nodes of the antenna system AS that do not exhibit voltage swings higher than a supply voltage of the transponder device TRX. To this end, the serial damping resistances RD1, RD2, RD3A, RD3B are inserted in current paths of the various antenna elements to dissipate the energy of the LC tank of the antenna system AS. As described in the previous embodiments, the damping resistances RD1, RD2, RD3A, RD3B are activated during the damping period by opening their respective switches SW1, SW2, SW3A, SW3B. Accordingly, an amplitude of the voltage swing can be reduced in appropriate time after each transmission burst period in order to make a resynchronization of the transponder device TRX, respectively its PLL, possible.

Figure 6:
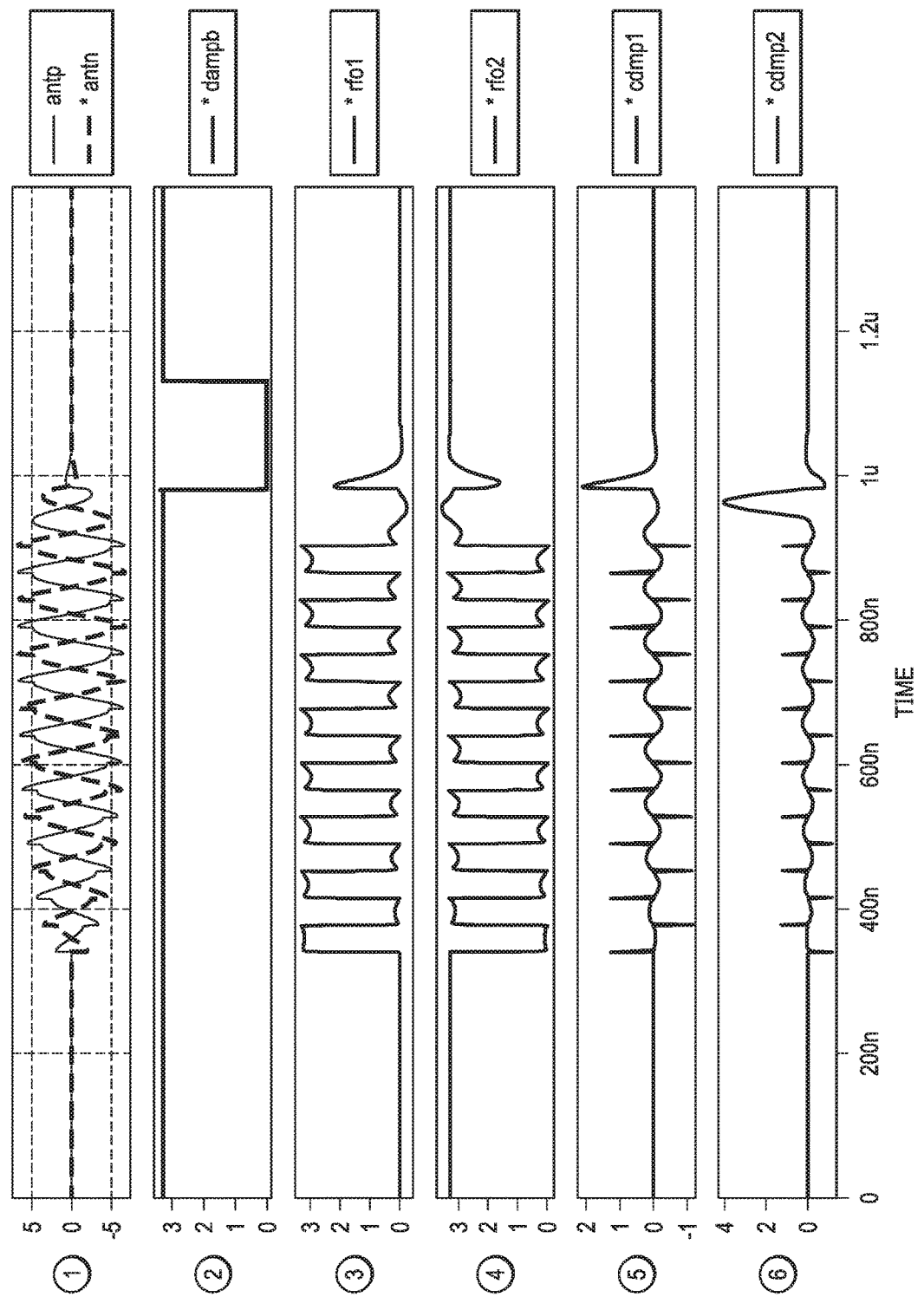
FIG. 6 shows a further signal time diagram of signals within an RFID transponder device.

FIG. 6 shows an exemplary signal time diagram of signals that may be present in the embodiment of FIG. 5. Similar to the diagram of FIG. 3, the top canvas 1 shows signals on both antenna coil terminals antn, antp. The second canvas 2 shows the respective damping control signal that opens the switches SW1, SW2, SW3A, SW3B during the damping period, thus having a low level during this damping period.

The third and the fourth canvases 3, 4 below depict both driving signals at the antenna output terminals RFO1, RFO2, while the lower canvases 5, 6 depict signals on the auxiliary terminals CDMP1, CDMP2.

As can be seen from the diagram of FIG. 6, the voltage swing at the antenna coil terminals antn, antp is reduced significantly during the damping period, which follows the eight carrier cycles of the transmission burst period, as described before for FIG. 3. Accordingly, a resynchronization on the carrier signal becomes possible in a synchronization period after the damping period.

While, with exception of FIG. 4, the above examples for transponder devices according to the improved concept use differential signals, respectively terminals, for processing the antenna signals, the improved concept can also further be applied with single-ended systems.

Figure 7:
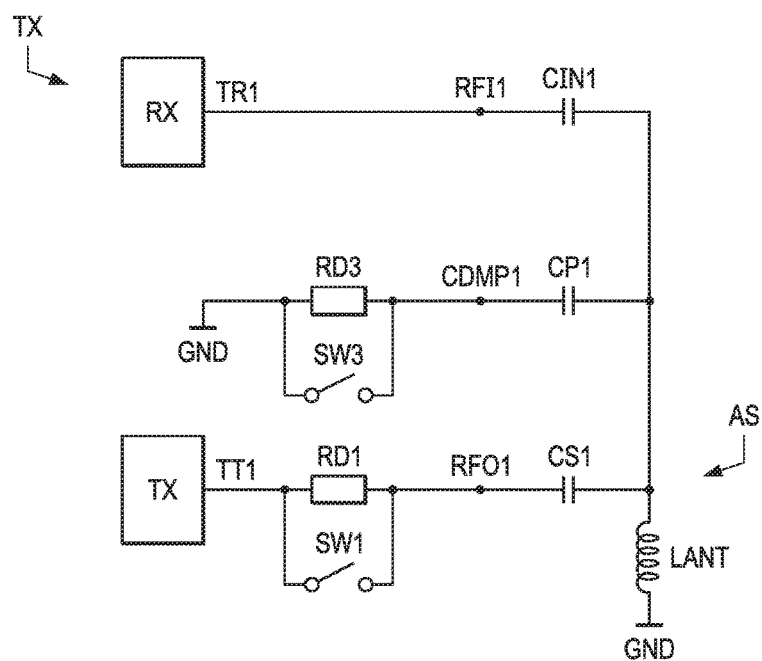
FIG. 7 shows a further exemplary embodiment of an RFID transponder device.

For example, FIG. 7 shows a further exemplary embodiment of a transponder system with a transponder device TRX and an antenna system that is based on the embodiment of FIG. 1. For example, the embodiment of FIG. 7 can be seen as a single ended version of the embodiment of FIG. 5.

Hence, also in this embodiment no parallel damping structure but only serial damping structures are present.

Accordingly, the receiver RX comprises a single receiver input terminal TR1, and the transmitter TX comprises a single transmitter output terminal Tn. Accordingly, the serial damping structures include only the first damping resistance RD1 with the parallel connected switch SW1 connected between the transmitter output terminal Tr1 and the antenna output terminal RFO1, and the parallel connection of the third damping resistance RD3 and switch SW3 connected between the auxiliary terminal CDMP1 and the ground potential terminal GND.

The function of the embodiment of FIG. 7 becomes easily apparent from the description of FIG. 5 above.

Figure 8:
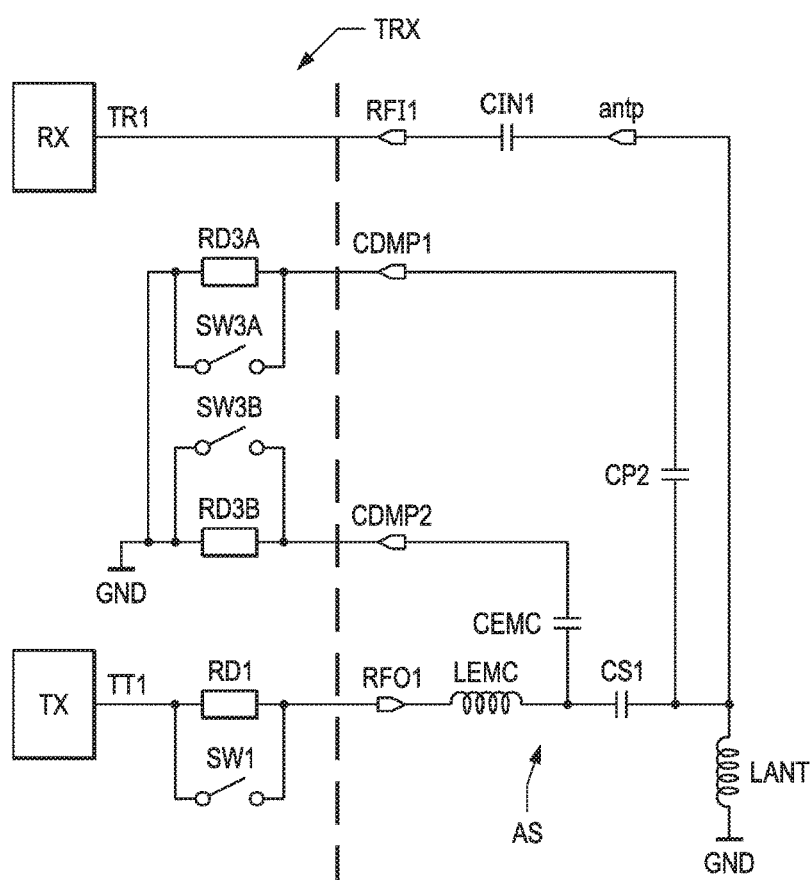
FIG. 8 shows a further exemplary embodiment of an RFID transponder device.

FIG. 8 shows a further exemplary embodiment of a transponder system with a transponder device TRX and an antenna system that is based on the embodiment of FIG. 1. Similar to the embodiment of FIG. 5, also in this embodiment no parallel damping structure but only serial damping structures are present.

With the single-ended concept, the receiver RX comprises only a single receiver input terminal TRI1, which is directly connected to a single antenna input terminal RFI1. Accordingly, the transmitter TX comprises a single transmitter output terminal TT1, which is coupled to the single antenna output terminal RFO1 by the serial damping structure comprising the parallel connection of the damping resistance RD1 and the switch SW1. Like in the embodiment of FIG. 5, the transponder device TRX comprises the auxiliary terminals CDMP1, CDMP2 which are connected to the reference potential terminal GND by the serial damping structures RD3A, SW3A and RD3B, SW3B.

The antenna system AS comprises the antenna coil LANT that is coupled to the reference potential terminal GND on one side. The other side antp is coupled to the antenna input terminal RFI1 by means of a capacitive element CIN1, to the first auxiliary terminal CDMP1 by a capacitive element CP1, and to the antenna output terminal RFO1 by a series connection of capacitive elements CS1 and an EMC (electromagnetic compatibility) coil LEMC. A connection node of the capacitive element CS1 and the coil LEMC is coupled to the second auxiliary terminal CDMP2 by means of a capacitive element CEMC. The coil LEMC and the capacitive element CEMC together form an LC filter, which is used as an EMC filter, for example.

The EMC filter constitutes another LC system that stores energy during the transmission burst period. Hence, damping is also preferably performed on these elements LEMC, CEMC. Accordingly, the respective serial damping structures RM1, SW1, RD3B, SW3B are present to dissipate energy from the EMC LC system during the damping period.

Accordingly, also with the embodiment of FIG. 8, damping of the voltage swing occurring during the transmission burst period can be achieved such that a resynchronization after the damping period is possible.

Figure 9:
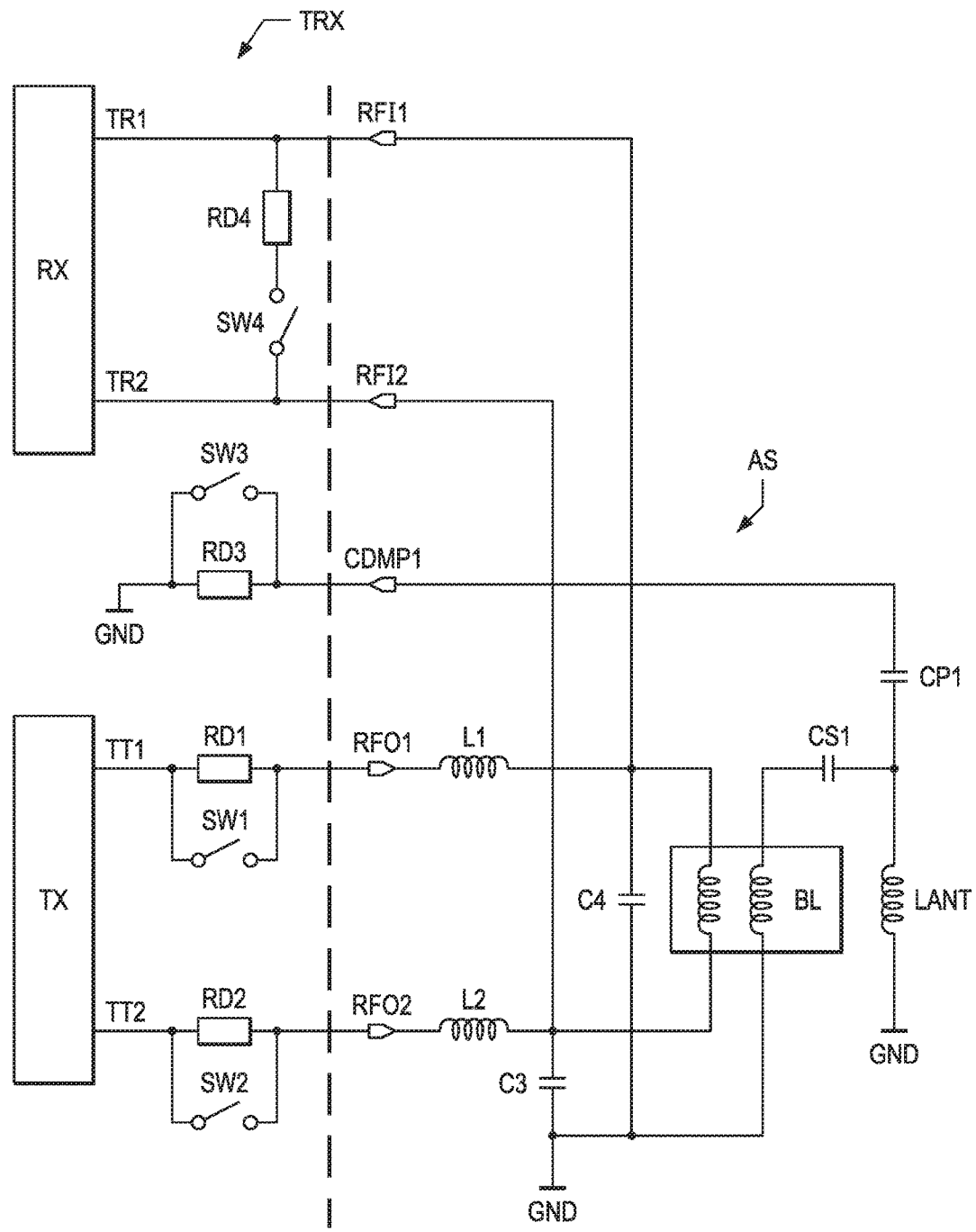
FIG. 9 shows a further exemplary embodiment of an RFID transponder device.

FIG. 9 shows a further embodiment of a transponder system with a transponder device TRX and an antenna system AS that at least partially is based on the embodiment of FIG. 1.

In the embodiment of FIG. 9, both serial damping structures and parallel damping structures are used in the transponder device TRX. Furthermore, the antenna system AS comprises a single-ended antenna coil LANT that is coupled on one side to a reference potential terminal GND. In order to use such a single-ended antenna with the differential inputs of the transponder device TRX, the antenna system AS comprises a balun BL. The second end of the antenna coil LANT is coupled to a first terminal of the balun BL, on the antenna side, by means of a capacitive element CS1 and further to the auxiliary terminal CDMP1 by means of the capacitive element CP1. A second terminal of the balun BL on the antenna side is coupled to the reference potential terminal GND. A third and a fourth terminal of the balun BL, being placed on the transmitter side, are coupled to the antenna output terminals RF1, RFO2 by means of respective coils L1, L2. The antenna input terminals RFI1, RFI2 are also coupled to the third and the fourth terminal of the balun BL. Furthermore, the third and the fourth terminal of the balun BL are connected to the reference potential terminal GND by respective capacitive elements C3, C4.

During operation of the transponder device TRX, the balun is used to convert the differential driver signal of the transmitter TX for the single-ended antenna use, as in this configuration the antenna coil ANT needs a single sided signal. In such a configuration, the amplitude of a signal on the antenna may be too high to be directly connected to the transponder device TRX, in particular the transmitter TX. Accordingly, in the embodiment of FIG. 9 the serial damping structures RM1, SW1, RD2, SW2 and further RD3, SW3 are present in order to dissipate energy of the antenna LC tank. Additionally, in order to dissipate the energy in the balun BL, the parallel damping structure RD4, SW4 with a direct connection of the antenna input terminals RFI1, RFI2 to the differential terminals, respectively third and fourth terminal of the balun BL is used. Preferably, the balun is designed such that it is operating on a sufficiently low characteristic resistance that a voltage swing during transmission burst period is low enough to comply with the requirements as described for the embodiment of FIG. 2.

In this case, the same result, in particular reducing of the voltage swing in a damping period, can be achieved, thus allowing the resynchronization after the damping period.

Figure 10:
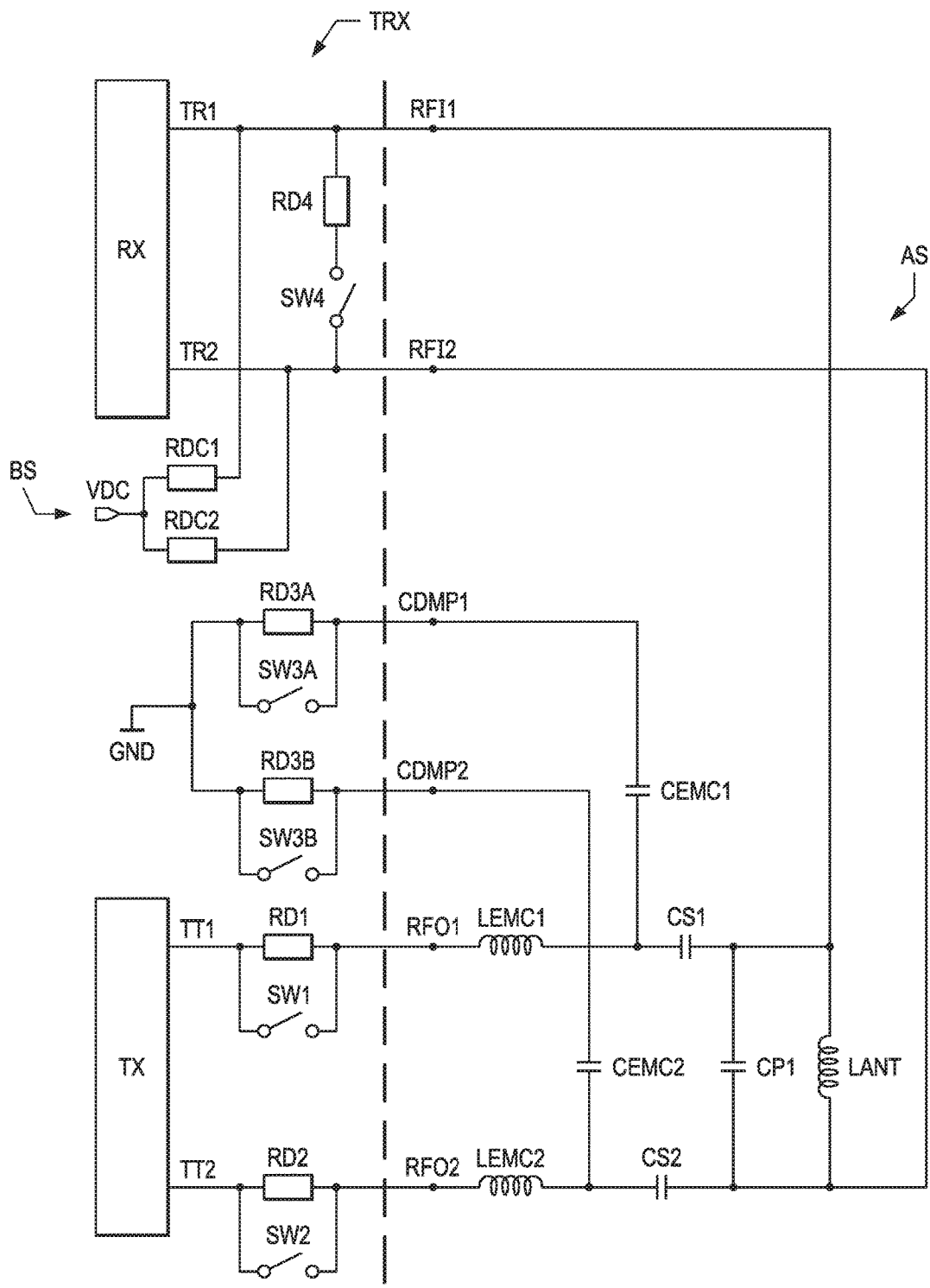
FIG. 10 shows a further exemplary embodiment of an RFID transponder device.

FIG. 10 shows a further embodiment of a transponder device TRX according to the improved concept, which is based on the embodiment of FIG. 1. Particularly, the embodiment of FIG. 10 can be seen as a double-ended version of the embodiment of FIG. 8 employing an EMC filter, with further application of the parallel damping structure RD4, SW4 with the bias circuit BS.

In this embodiment, the single LC filter structure of FIG. 8, including the EMC coil LEMC and the EMC capacitor CEMC are replaced by two respective EMC structures, respectively LC structures, consisting of the combination of coil LEMC1 and capacitor CMC1, respectively coil LEMC2 and capacitor CEMC2. The energy stored in these LC systems during the transmission burst period can be dissipated by means of the serial damping structures RD3A, SW3A, RD3B, SW3B at the auxiliary terminals CDMP1, CDMP2 and by the damping structures RD1, SW1, RD2, SW2 at the antenna output terminals RFO1, RFO2.

In this embodiment, the serial damping can be combined with the parallel damping at the receiver side, assuming that in the proposed configuration an amplitude of the signal on the antenna coil is not larger than the maximum voltage allowed by the technology used to implement the receiver RX.

Accordingly, also with the embodiment of FIG. 10, damping of the voltage swing occurring during the transmission burst period can be achieved such that a resynchronization after the damping period is possible.

Figure 11:
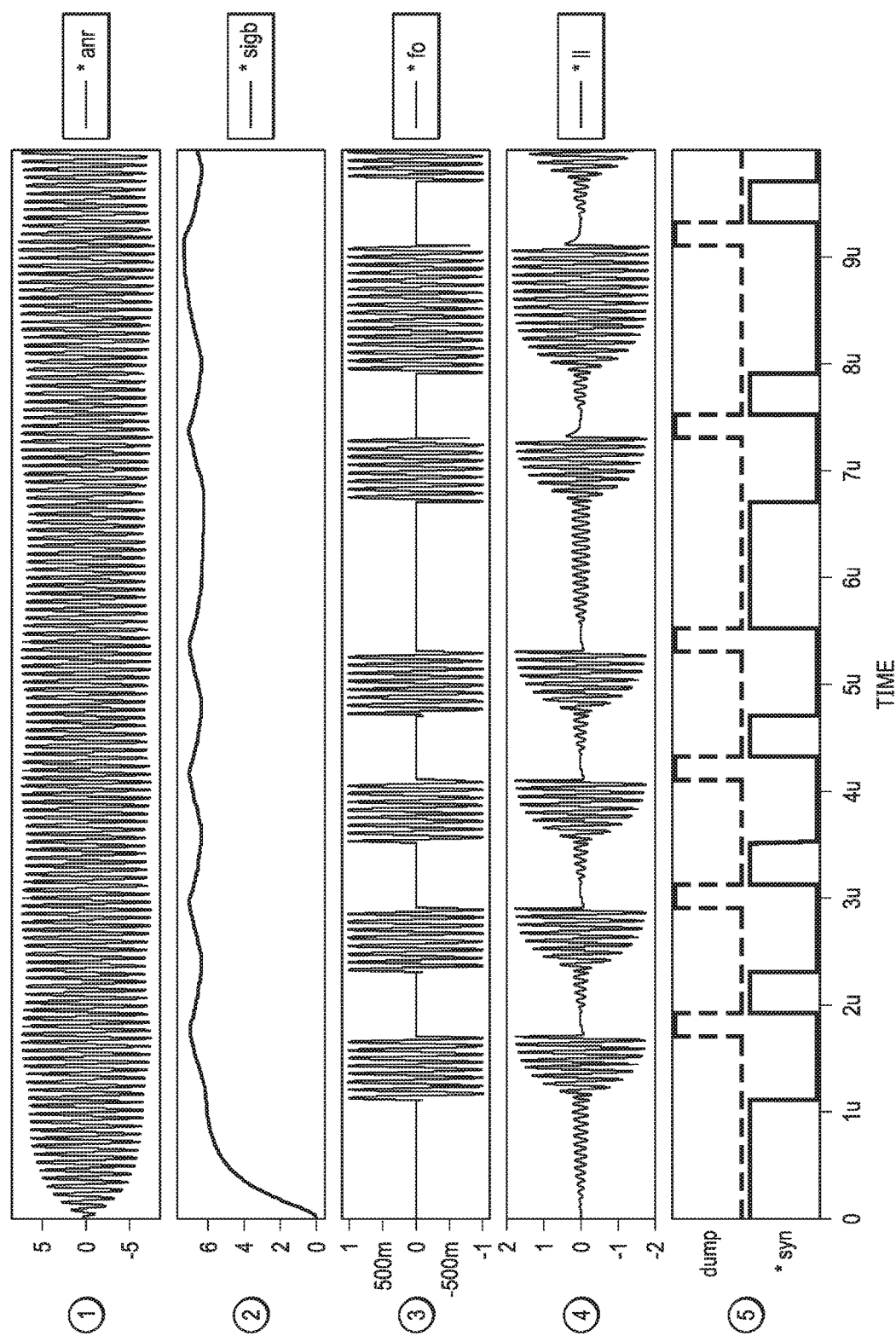
FIG. 11 shows a further exemplary signal time diagram of signals within an RFID transponder device.

FIG. 11 shows a further signal time diagram which acts as an example for signals that may be present in a transponder device TRX according to the improved concept, for example according to one of the embodiments described above.

The top canvas 1 depicts a signal on the RFID reader antenna, whereas the canvas 2 below depicts an envelope of the signal of the top canvas. The third canvas 3 depicts a signal corresponding to a current of the transmitter TX. In particular, respective transmission burst periods with eight carrier cycles can be seen in the diagram of FIG. 11. Canvas 4 below shows a signal on the antenna coil LANT of the tag comprising the transponder device TRX. The bottom canvas 5 depicts control signals for the damping of oscillations in the upper tray and resynchronization in the lower tray.

It can easily be seen that in the signal of canvas 4, the oscillation is clearly reduced during the damping periods, allowing the resynchronization in the following resynchronization periods.

In the various embodiments described above, it becomes apparent that damping resistances may be provided and activated during damping periods in order to reduce a voltage swing at terminals of the transponder device. Depending on an amplitude of the voltage swing, either parallel damping structures or serial damping structures can be used and respectively selected on the basis of the voltage swing. As described above, also a combination of serial and parallel damping structures can be used.

Particularly, during production of such transponder devices TRX, the transponder device TRX can be produced with both serial and parallel damping structures, for example with all kinds of damping structures described above. When implementing the transponder device TRX, for example in an RFID tag with known specifications, the respective damping structures that will not be needed during operation of the tag may be deactivated, for example by a selection device SEL as described. Such selection may be made permanently or once only, respectively. However, in some implementations such a selection could be possible also during operation of the transponder device TRX, for example if operating conditions change during operation.

In any case, respective resistance values of the damping resistances can be determined in advance based on calibration measurements or simulations of the target system. In order to achieve a damping of the voltage swing as fast as possible. For example, such damping periods may last for two to four, in particular two or three carrier cycles of a reader signal in order to have enough time during the resynchronization period for a resynchronization on the carrier frequency.

What is claimed is:

1. An RFID transponder device comprising:
   an antenna terminal configured to be coupled to a first terminal of an antenna;
   a receiver coupled to the antenna terminal;
   a transmitter coupled to the antenna terminal;
   a damping resistor coupled to the antenna terminal;
   a switch coupled to the damping resistor; and
   a damping control circuit configured to activate the damping resistor by controlling the switch during a damping period after a first transmission burst period of the transmitter.

2. The device of claim 1, wherein the damping control circuit is further configured to deactivated the damping resistor during a synchronization period after the damping period and before a second transmission burst period by controlling the switch.

3. The device of claim 1, further comprising the antenna.

4. The device of claim 1, wherein the damping resistor comprises a resistance between 10 Ω and 100 Ω.

5. The device of claim 1, further comprising:
a second antenna terminal configured to be coupled to a second terminal of the antenna; and
a first resistor having a first terminal coupled to the receiver, wherein:
the damping resistor is coupled in series with the switch,
the switch is coupled to a reference node,
the reference node is coupled to the first resistor and to the second antenna terminal, and
the transmitter is coupled to the antenna terminal via a first capacitor.

6. The device of claim 5, further comprising a bias circuit coupled to the reference node, the bias circuit configured to provide a bias voltage to the reference node.

7. The device of claim 1, further comprising:
a second damping resistor coupled between the transmitter and the antenna terminal,
a first capacitor coupled between the second damping resistor and the antenna terminal,
a second capacitor coupled between the damping resistor and the antenna terminal, and
a second switch coupled in parallel with the second damping resistor, wherein:
the damping resistor is coupled in parallel with the switch,
the damping resistor is coupled between the second capacitor and a reference node,
the receiver is coupled to the antenna terminal via a third capacitor, and
the damping control circuit is further configured to activate the second damping resistor by controlling the second switch during the damping period after the first transmission burst period.

8. The device of claim 7, further comprising:
a coil coupled between the second damping resistor and the first capacitor;
a third damping resistor coupled between the reference node and the coil;
a third switch coupled in parallel with the third damping resistor;
a fourth capacitor coupled between the third damping resistor and the coil; and
the damping control circuit is further configured to activate the third damping resistor by controlling the third switch during the damping period after the first transmission burst period.

9. The device of claim 1, further comprising:
the antenna, wherein the antenna is coupled between a reference node and a balun via a first capacitor;
a second damping resistor coupled between a first terminal of the transmitter and the antenna terminal;
a second switch coupled in parallel with the second damping resistor;
a first coil coupled between the second damping resistor and the antenna terminal;
a third damping resistor coupled between a second terminal of the transmitter and the antenna terminal;
a third switch coupled in parallel with the third damping resistor;
a second coil coupled between the second damping resistor and the damping resistor;
a fourth damping resistor coupled between the reference node and the antenna; and
a fourth switch coupled in parallel with the fourth damping resistor, wherein:
the antenna terminal is coupled to the first terminal of the antenna via the balun,
the receiver comprises a first terminal and a second terminal, the first terminal of the receiver being coupled to the antenna terminal,
the switch is coupled between the first terminal of the receiver and the second terminal of the receiver, the switch being coupled in series with the damping resistor, and
the damping control circuit is further configured to activate the second, third and fourth damping resistors by controlling the second, third and fourth switches during the damping period after the first transmission burst period.

10. The device of claim 1, further comprising:
a second antenna terminal configured to be coupled to a second terminal of the antenna;
a first resistor coupled between the antenna terminal and a first reference node;
a second resistor coupled between the second antenna terminal and the first reference node;
a first capacitor coupled between a first terminal of the transmitter and the antenna terminal;
a first coil coupled between the first capacitor and the first terminal of the transmitter;
a second damping resistor coupled between the first coil and the first terminal of the transmitter;
a second switch coupled in parallel with the second damping resistor;
a second capacitor coupled between a second terminal of the transmitter and the second antenna terminal;
a second coil coupled between the second capacitor and the second terminal of the transmitter;
a third damping resistor coupled between the second coil and the second terminal of the transmitter;
a third switch coupled in parallel with the third damping resistor;
a third capacitor coupled between a second reference node and the first coil;
a fourth damping resistor coupled between the second reference node and the third capacitor;
a fourth switch coupled in parallel with the fourth damping resistor;
a fourth capacitor coupled between the second reference node and the second coil;
a fifth damping resistor coupled between the second reference node and the fourth capacitor; and
a fifth switch coupled in parallel with the fifth damping resistor, wherein:
the receiver comprises a first terminal coupled to the antenna terminal and a second terminal coupled to the second antenna terminal,
the switch is coupled between the first terminal of the receiver and the second terminal of the receiver, the switch being coupled in series with the damping resistor, and
the damping control circuit is further configured to activate the second, third, fourth and fifth damping resistors by controlling the second, third, fourth and fifth switches during the damping period after the first transmission burst period.

11. A method of operating a transponder device, the method comprising:
transmitting a signal to an antenna during a first transmission burst period;
after the first transmission burst period, damping oscillation across terminals of the antenna during a damping period by activating a damping resistor coupled to the antenna, wherein activating the damping resistor comprises controlling a switch coupled to the damping resistor;

after the damping period, deactivating the damping resistor and synchronizing the transponder device; and after synchronizing the transponder device, transmitting a signal to the antenna during a second transmission burst period.

12. The method of claim 11, wherein the first transmission burst period comprises eight consecutive carrier periods.

13. The method of claim 11, wherein the damping period lasts between 1 to 4 carrier periods.

14. The method of claim 11, wherein transmitting the signal complies with an ISO/IEC 14443 Type A or B standard.

15. The method of claim 11, further comprising determining a value of a resistance of the damping resistor during a calibration step.

16. The method of claim 11, further comprising determining whether to couple the damping resistor with the switch in series or in parallel based on a voltage swing across terminals of the antenna during the first transmission burst period.

17. The method of claim 11, further comprising providing a bias voltage across terminals of the antenna.

18. The method of claim 17, wherein the bias voltage is about half a peak-to-peak voltage of a voltage swing across terminals of the antenna.

19. The method of claim 11, further comprising storing a desired configuration of damping resistor of the transponder device in non-volatile memory.

20. A transponder device comprising:

means for transmitting a signal to an antenna during a first transmission burst period;

means for damping oscillation across terminals of the antenna during a damping period after the first transmission burst period by activating a damping means coupled to the antenna;

means for deactivating the damping means and synchronizing the transponder device after the damping period; and means for transmitting a signal to the antenna during a second transmission burst period after synchronizing the transponder device.

* * * * *